US010776090B2

(12) United States Patent
Ishizaki (10) Patent No.: US 10,776,090 B2
(45) Date of Patent: Sep. 15, 2020

(54) REDUCING OVERHEAD OF DATA CONVERSATION BETWEEN JAVA AND NON-JAVA REPRESENTATIONS

(71) Applicant: INTERNATIONAL BUSINESS MACHINES CORPORATION, Armonk, NY (US)

(72) Inventor: Kazuaki Ishizaki, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/872,534

(22) Filed: Jan. 16, 2018

(65) Prior Publication Data

US 2019/0220258 A1 Jul. 18, 2019

(51) Int. Cl.
*G06F 9/44* (2018.01)
*G06F 8/41* (2018.01)
*G06F 12/02* (2006.01)
*G06F 9/448* (2018.01)

(52) U.S. Cl.
CPC .......... *G06F 8/4434* (2013.01); *G06F 8/443* (2013.01); *G06F 12/02* (2013.01); *G06F 12/0253* (2013.01); *G06F 9/4484* (2018.02); *G06F 2212/1044* (2013.01)

(58) Field of Classification Search
CPC .................................................. G06F 8/4434
USPC ........................................................ 717/153
See application file for complete search history.

(56) References Cited

U.S. PATENT DOCUMENTS

| | | | | |
|---|---|---|---|---|
| 6,594,820 | B1* | 7/2003 | Ungar | G06F 11/3688 714/38.13 |
| 7,237,237 | B2* | 6/2007 | Foti | G06F 12/0261 707/999.202 |
| 8,352,797 | B2* | 1/2013 | Black | G06F 9/468 710/28 |
| 8,533,665 | B2* | 9/2013 | Yu | G06F 9/4488 717/108 |
| 8,832,466 | B1* | 9/2014 | McGregor, Jr. | H04L 9/0836 713/193 |
| 8,881,100 | B2* | 11/2014 | Bohm | G06F 9/44 717/108 |
| 9,038,039 | B2 | 5/2015 | Song et al. | |
| 2014/0095523 | A1 | 4/2014 | Kim et al. | |
| 2015/0293713 | A1* | 10/2015 | Seo | G06F 12/0246 711/103 |

(Continued)

OTHER PUBLICATIONS

Xin, et al., "Project Tungsten: Bringing Apache Spark Closer to Bare Metal", Engineering Blog, Databicks, Apr. 2015, 8 pages.

(Continued)

*Primary Examiner* — Evral E Bodden
(74) *Attorney, Agent, or Firm* — Tutunjian & Bitetto, P.C.; Vazken Alexanian (57) ABSTRACT

A computer-implemented method and a computer program product are provided for converting a first object having a first data format to a second object having a second data format that is different from the first format in that the second data format requires an object header. The method includes adding the object header to the first object. The method further includes returning, as a pointer, an address of the added object header to a user defined function that uses the second object. The first object lacks pointers to other objects, and does not escape.

20 Claims, 10 Drawing Sheets

(56) References Cited

U.S. PATENT DOCUMENTS

2017/0052766 A1    2/2017  Garipov

OTHER PUBLICATIONS

GitHub, .NET Core Common Language Runtime (CoreCLR), Available at: https://github.com/dotnet/core, last downloaded Sep. 28, 2017, 13 pages.
In SlideShare, Compiled Python UDFs for Impala, Available at: https://www.slideshare.net/cloudera/20140520-impala-meetuppythonudfpptx/2, May 2014, 5 pages.

* cited by examiner

```
val ds = sparkContext.parallelize(
    Seq(Array(1.0, 8.0)), 1).toDS().cache
ds.count
val a = ds.map(a: Array[Double] => a(0))
a.show
```

UnsafeArrayData     null bits         Element (0)          Element (1)
elements 2
02,00,00,00,00,00,00,00,00,00,00,00,00,00,00,00,f0,3f,00,00,00,00,00,00,00,20,40

⇨ toDoubleArray()

double[] deserializetooobject_funcResult = {1.0, 8.0}

Java® double array   null bits         Element (0)          Element (1)
JVM metadata
??,??,??,??,??,??,??,??,??,??,??,??,??,??,??,??,00,00,00,00,00,00,00,00,00,20,40,00,00,00,00,00,00,00,f0,3f,00,00,00,00,00,00,00,20,40

```
/* 041 */   protected void processNext() throws java.io.IOException {
/* 042 */     while (inputadapter_input.hasNext()) {
/* 043 */       InternalRow inputadapter_row = (InternalRow) inputadapter_input.next();
/* 044 */       boolean inputadapter_isNull = inputadapter_row.isNullAt(0);
/* 045 */       ArrayData inputadapter_value = inputadapter_isNull ? null : (inputadapter_row.getArray(0));
/* 047 */       boolean deserializetoobject_isNull = true;
/* 048 */       double[] deserializetoobject_value = null;
/* 049 */       if (!inputadapter_isNull) {
/* 050 */         deserializetoobject_isNull = false;
/* 051 */         if (!deserializetoobject_isNull) {
/* 052 */           Object deserializetoobject_funcResult = null;
/* 053 */           deserializetoobject_funcResult = inputadapter_value.toDoubleArray();
/* 054 */           if (deserializetoobject_funcResult == null) {
/* 055 */             deserializetoobject_isNull = true;
/* 056 */           } else {
/* 057 */             deserializetoobject_value = (double[]) deserializetoobject_funcResult;
/* 058 */           }
/* 060 */         }
/* 061 */         deserializetoobject_isNull = deserializetoobject_value == null;
/* 062 */       }
/* 064 */       Object mapelements_obj = ((Expression) references[0]).eval(null);
/* 065 */       scala.Function1 mapelements_value1 = (scala.Function1) mapelements_obj;
```

```
/* 065 */   scala.Function1 mapelements_value1 = (scala.Function1) mapelements_obj;
/* 066 */   boolean mapelements_isNull = true;
/* 067 */   double mapelements_value = -1.0;
/* 069 */   mapelements_argValue = deserializetoobject_value;
/* 071 */   mapelements_isNull = false;
/* 073 */   Object mapelements_funcResult = null;
/* 074 */   mapelements_funcResult = mapelements_value1.apply(mapelements_argValue);
/* 075 */   if (mapelements_funcResult == null) {
/* 076 */     mapelements_isNull = true;
/* 077 */   } else {
/* 078 */     mapelements_value = (Double) mapelements_funcResult;
/* 079 */   }
/* 085 */   serializefromobject_rowWriter.zeroOutNullBytes();
/* 087 */   if (mapelements_isNull) {
/* 088 */     serializefromobject_rowWriter.setNullAt(0);
/* 089 */   } else {
/* 090 */     serializefromobject_rowWriter.write(0, mapelements_value);
/* 091 */   }
/* 092 */   append(serializefromobject_result);
/* 093 */   if (shouldStop()) return;
/* 094 */   }
/* 095 */ }
```

```
/* 041 */   protected void processNext() throws java.io.IOException {
/* 042 */     while (inputadapter_input.hasNext()) {
/* 043 */       InternalRow inputadapter_row = (InternalRow) inputadapter_input.next();
/* 044 */       boolean inputadapter_isNull = inputadapter_row.isNullAt(0);
/* 045 */       ArrayData inputadapter_value = inputadapter_isNull ? null : (inputadapter_row.getArray(0));
/* 047 */       boolean deserializetoobject_isNull = true;
/* 048 */       double[] deserializetoobject_value = null;
/* 049 */       if (!inputadapter_isNull) {
/* 052 */         Object deserializetoobject_funcResult = null;
/* 053 */         deserializetoobject_funcResult = inputadapter_value.getJavaArrayObjectPointer();
/* 054 */         inputadapter_value.setJVMArrayObjectMetadata();
/* 055 */         if (deserializetoobject_funcResult == null) {
/* 056 */           deserializetoobject_isNull = true;
/* 057 */         } else {
/* 058 */           deserializetoobject_value = (double[]) deserializetoobject_funcResult;
/* 061 */         }
/* 062 */         deserializetoobject_isNull = deserializetoobject_value == null;
/* 064 */       Object mapelements_obj = ((Expression) references[0]).eval(null);
/* 065 */       scala.Function1 mapelements_value1 = (scala.Function1) mapelements_obj;
```

FIG. 9

```
/* 066 */    boolean mapelements_isNull = true;
/* 067 */    double mapelements_value = -1.0;
/* 069 */    mapelements_argValue = deserializetoobject_value;
/* 071 */    mapelements_isNull = false;
/* 073 */    Object mapelements_funcResult = null;
/* 074 */    mapelements_funcResult = mapelements_value1.apply(mapelements_argValue);
             mapelements_argValue = null; deserializetoobject_funcResult = null;
             deserializetoobject_value = null;
/* 075 */    if (mapelements_funcResult == null) {
/* 076 */        mapelements_isNull = true;
/* 077 */    } else {
/* 078 */        mapelements_value = (Double) mapelements_funcResult;
/* 079 */    }
/* 085 */    serializefromobject_rowWriter.zeroOutNullBytes();
/* 087 */    if (mapelements_isNull) {
/* 088 */        serializefromobject_rowWriter.setNullAt(0);
/* 089 */    } else {
/* 090 */        serializefromobject_rowWriter.write(0, mapelements_value);
/* 091 */    }
/* 092 */    append(serializefromobject_result);
/* 093 */    if (shouldStop()) return;
/* 094 */ }
/* 095 */ }
```

FIG. 10

REDUCING OVERHEAD OF DATA CONVERSATION BETWEEN JAVA AND NON-JAVA REPRESENTATIONS

BACKGROUND

Technical Field

The present invention relates generally to information processing and, in particular, to reducing the overhead of a data conversion between Java and non-Java representations.

Description of the Related Art

Apache Spark® (hereinafter Spark® in short) is a distributed in-memory computation framework that can be written in Scala and/or Java®. Spark® introduced its own data representation (also interchangeably referred to herein as "Spark® data representation" and "non-Java representation") instead of the Java® object format in order to reduce space/runtime overhead. The Spark® data representation exists in a Java® byte array on a Java® heap.

Spark® introduced Dataset. A Dataset is a strongly typed collection of domain-specific objects that can be transformed in parallel using functional or relational operations. Operations available on Datasets are divided into transformations and actions. Transformations are operations that produce new Datasets, and actions are operations that trigger computations and return results. Example transformations include, but are not limited to: map; filter; and select. Example actions include, but are not limited to: count; show; and writing data out to file systems.

Dataset allows programmers to write their-defined functions using a lambda function in Scala or Java®. As example function is as follows:

Dataset.map(e=>e*2), Dataset.filter(e=>e>1)

When Spark® runtime calls Dataset.map( ), data conversions between data in Sparks' data representation and the Java® heap are required. These conversion are explicitly generated by Spark® runtime.

However, these data conversions (particular for arrays) are slow and performance bottlenecks. Hence, there is a need for a way to reduce the overhead for a data conversion between Java and non-Java (e.g., Spark®) data representations.

SUMMARY

According to an aspect of the present invention, a computer-implemented method is provided for converting a first object having a first data format to a second object having a second data format that is different from the first format in that the second data format requires an object header. The method includes adding the object header to the first object. The method further includes returning, as a pointer, an address of the added object header to a user defined function that uses the second object. The first object lacks pointers to other objects, and does not escape.

According to another aspect of the present invention, a computer program product is provided for converting a first object having a first data format to a second object having a second data format that is different from the first format in that the second data format requires an object header. The computer program product includes a non-transitory computer readable storage medium having program instructions embodied therewith. The program instructions are executable by a computer to cause the computer to perform a method. The method includes adding the object header to the first object. The method further includes returning, as a pointer, an address of the added object header to a user defined function that uses the second object. The first object lacks pointers to other objects, and does not escape.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

The present invention is directed to reducing the overhead of a data conversion between Java and non-Java representations.

In an embodiment, in the data format that exists in an object for a managed runtime (such as Java virtual machine), the present invention ensures there is no pointer to other objects in a target object to be optimized (e.g., an array object). For example, a primitive type array (e.g. int array, double array) does not include any pointer to other objects since it has only numeric values.

In an embodiment, the present invention also ensures the target object does not escape to an instance variable, a static variable, and variables in other (non-owning) threads.

In an embodiment, the present invention puts metadata for a managed runtime into the memory region before the target (non-Java®) object to be optimized in order to generate a converted Java® object. It is to be appreciated that the metadata depends on the managed runtime that is running.

In an embodiment, when the target object to be optimized is translated into the converted Java object, an address of the metadata is returned. A lifetime of the converted Java® object is, in turn, kept shorter than the lifetime of the target object. For example, in an embodiment, the present invention nullifies the pointer of the converted object after the last use of the pointer of the converted object.

In an embodiment, in a garbage collector of the managed runtime, the present invention:
(1) adjusts a pointer to the converted Java® object to be optimized when the Java object for the own data format is moved by the garbage collection;
(2) does not free only the target to be optimized (the Java® object for the own data format should be freed);
(3) does not copy only the target object to be optimized by copying garbage collection.

Figure 1:
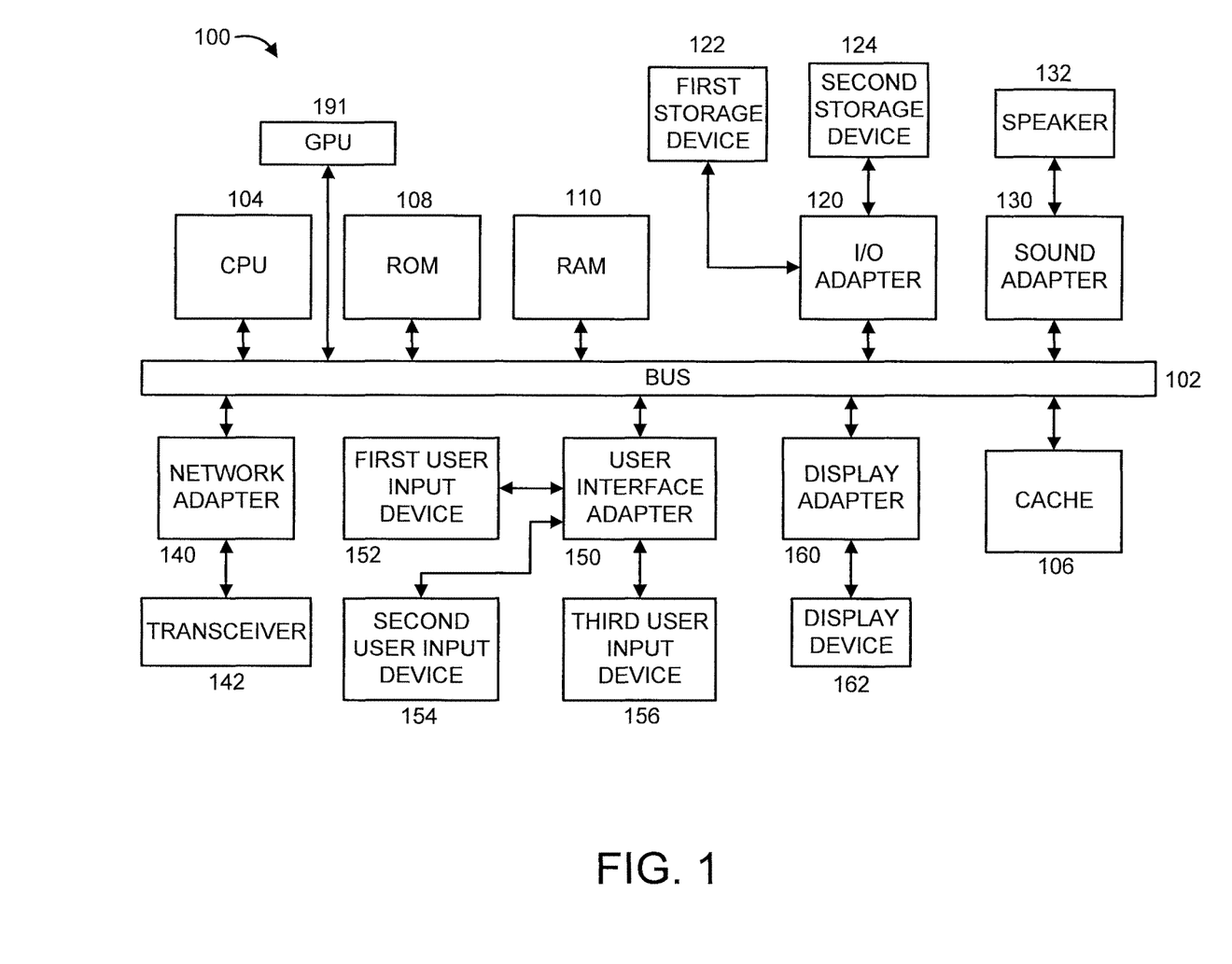
FIG. 1 shows an exemplary processing system to which the present invention may be applied, in accordance with an embodiment of the present invention.

FIG. 1 shows an exemplary processing system 100 to which the invention principles may be applied, in accordance with an embodiment of the present invention. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102. At least one Graphics Processing Unit (GPU) 194 is operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

Figure 3:
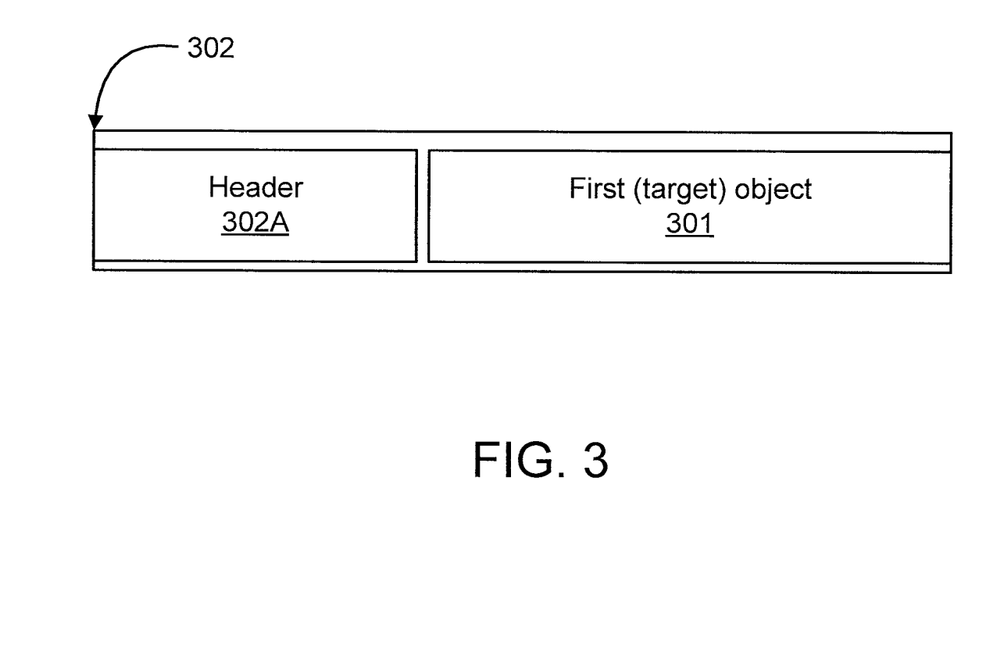
FIG. 3 shows an exemplary result of a step of FIG. 2, in accordance with an embodiment of the present invention.

It is to be appreciated that processing system 100 may perform at least part of the method described herein including, for example, at least part of method 300 of FIG. 3.

Figure 2:
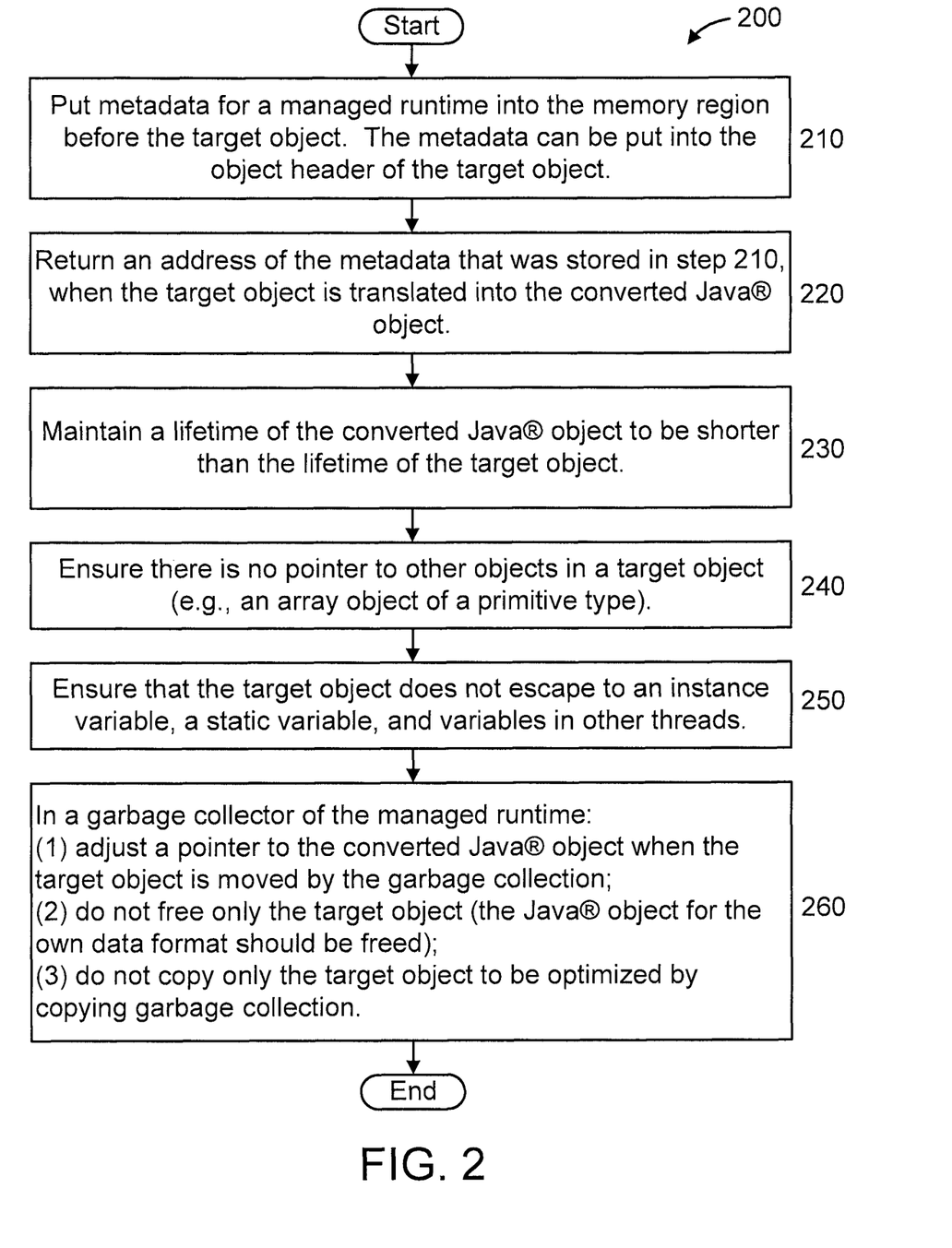
FIG. 2 shows an exemplary method for reducing overhead for a data conversion between a Java representation and a non-Java representation, in accordance with an embodiment of the present invention.

FIG. 2 shows an exemplary method 200 for reducing overhead for a data conversion between a first object ("target object") having a first data format and a second object ("converted Java object") having a second data format that is different from the first data format in that the second data format requires an object header, in accordance with an embodiment of the present invention. In an embodiment, the method 200 reduces the overhead by embedding metadata/Java® object information into the non-Java® data representation that points to a user defined function that uses the Java® data object.

At step 210, put metadata for a managed runtime into the memory region before the target object. In an embodiment, the metadata can be put into the object header of the target object. It is to be appreciated that the metadata depends on the managed runtime that is running. FIG. 3 shows an exemplary result of step 210 of FIG. 2, in accordance with an embodiment of the present invention. In particular, FIG. 3 shows the target ("first") object 301 having the first data format and the converted Java object 302 with a header 302 as required by the second data format.

At step 220, return an address of the metadata that was stored in step 210, when the target object is translated into the converted Java® object.

At step 230, maintain a lifetime of the converted Java® object to be shorter than the lifetime of the target object. For example, in an embodiment, the present invention nullifies the pointer of the converted object after the last use of the pointer of the converted object.

At step 240, ensure there is no pointer to other objects in a target object (e.g., an array object of a primitive type). For example, a primitive type array (e.g. int array, double array) does not include any pointer to other objects since it has only numeric values.

At step 250, ensure that the target object does not escape to an instance variable, a static variable, and variables in other threads.

At step 260, in a garbage collector of the managed runtime:
(1) adjust a pointer to the converted Java® object when the target object is moved by the garbage collection;
(2) do not free only the target object (the Java® object for the own data format should be freed);
(3) do not copy only the target object to be optimized by copying garbage collection.

Figure 4:
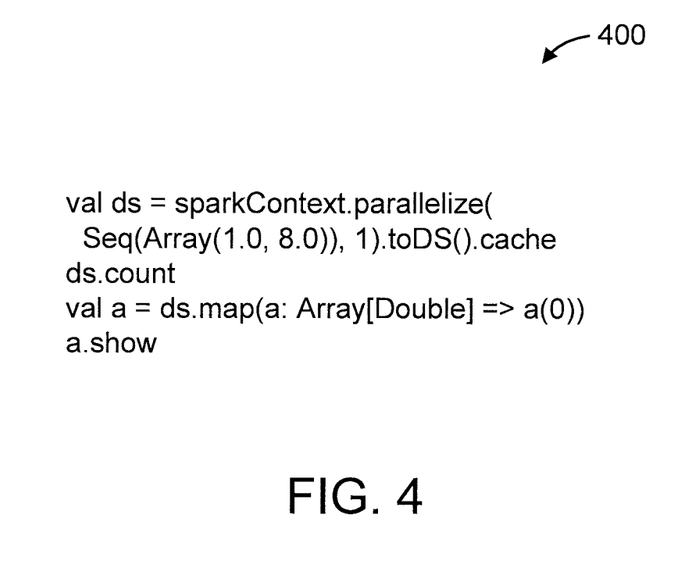
FIG. 4 shows an exemplary Spark® program to which the present invention can be applied, in accordance with an embodiment of the present invention.

FIG. 4 shows an exemplary Spark® program 400 to which the present invention can be applied, in accordance with an embodiment of the present invention. The Spark® program 400 involves a data conversion operation between Java® and non-Java® representations.

Figure 5:
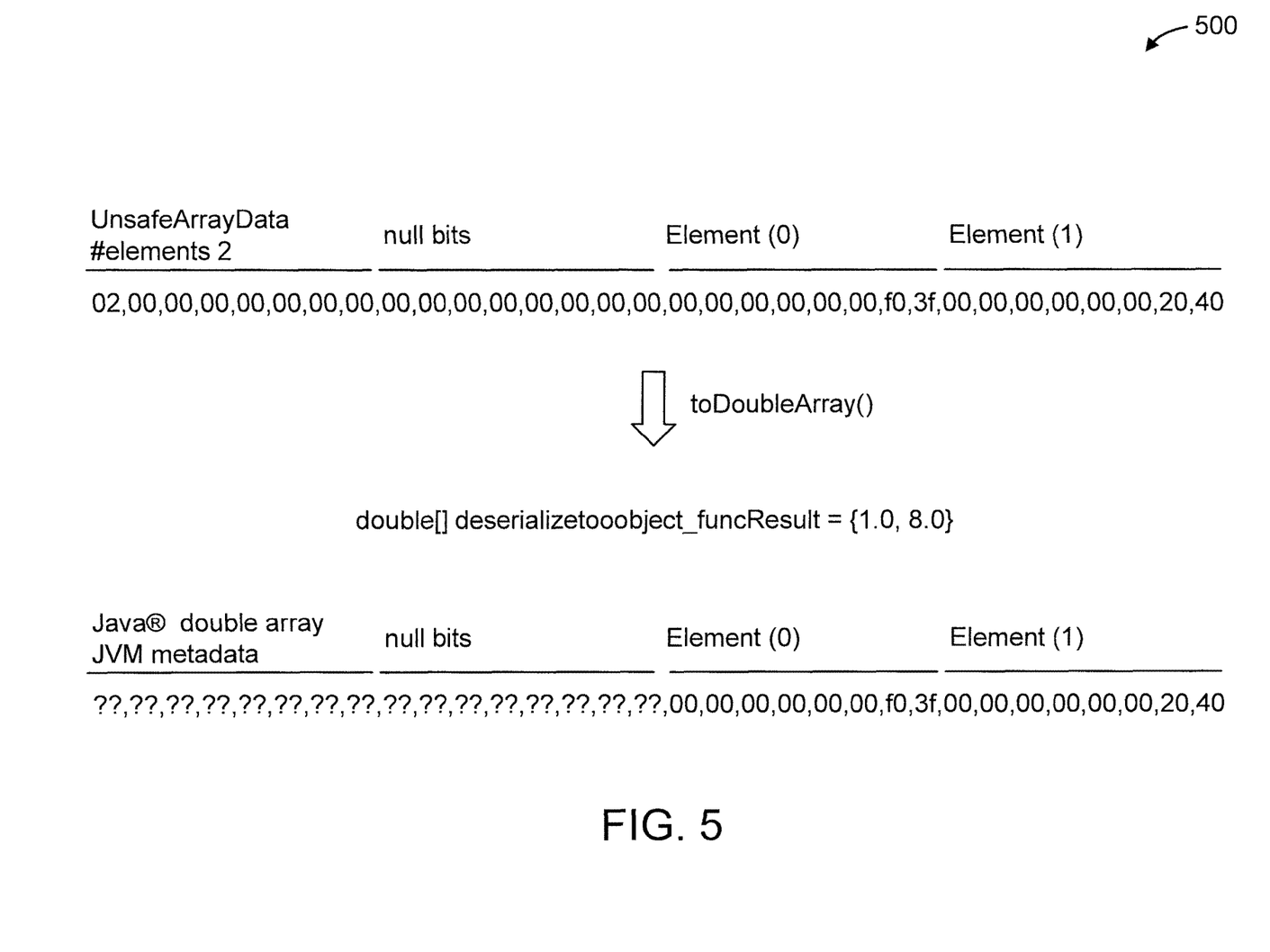
FIG. 5 shows an exemplary Spark® (non-Java®) format, relating to the Spark® program of FIG. 4, and involving a data conversion from a Java® byte array to a Java® double array using the Spark® data representation, without use of the present invention.

FIG. 5 shows an exemplary Spark® (non-Java®) format 500, relating to the Spark® program 400 of FIG. 4, and involving a data conversion from a Java® byte array to a Java® double array using the Spark® data representation, without use of the present invention. Referring to FIG. 5, "UnsafeArrayData keeps data for any array by using the Spark® (non-Java®) data representation.

Figure 6:
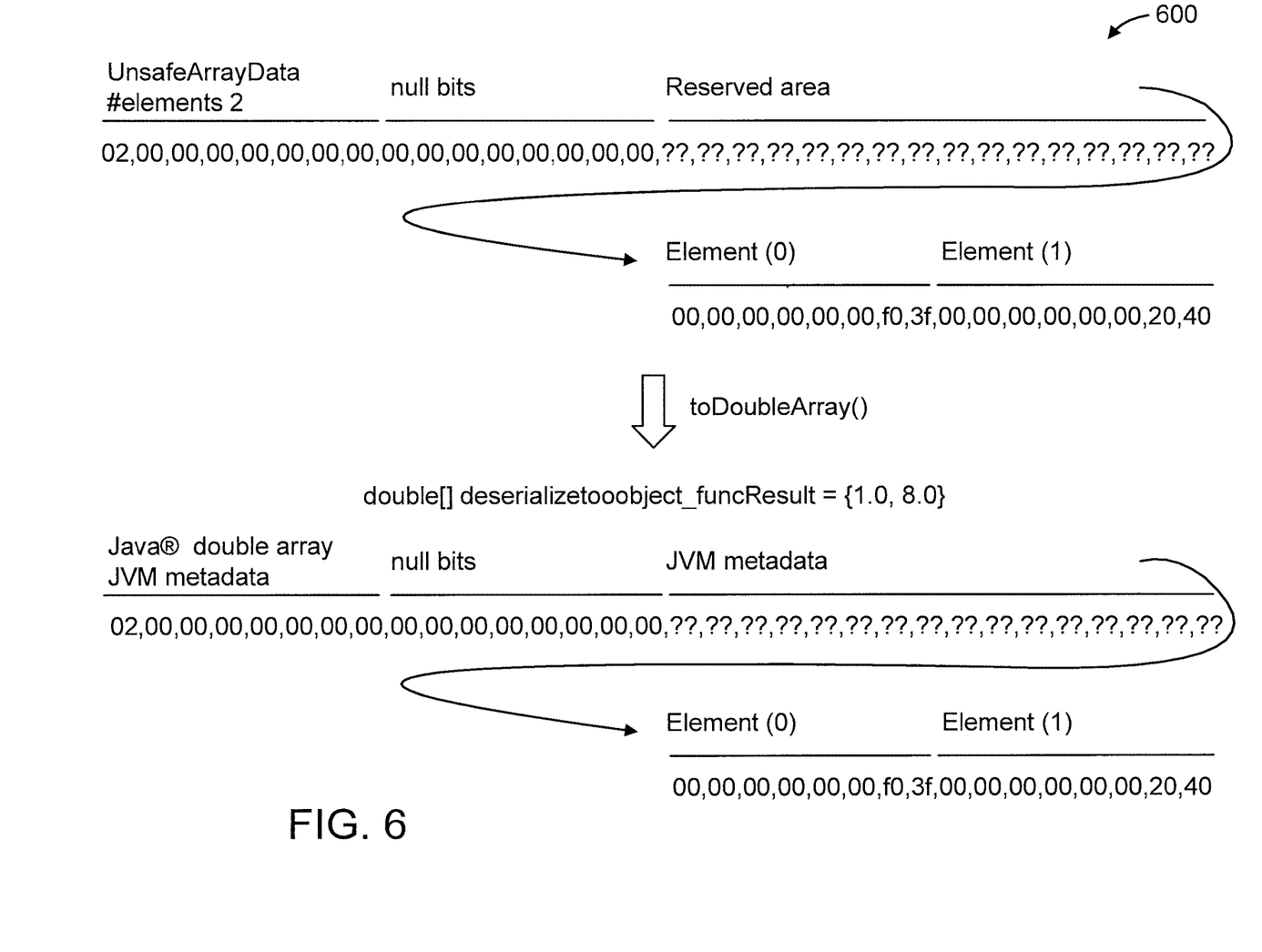
FIG. 6 shows an exemplary Spark® (non-Java®) format, relating to the Spark® program of FIG. 4, and involving a data conversion from a Java byte array to a Java® double array using the Spark® data representation and with use of the present invention, in accordance with an embodiment of the present invention.

FIG. 6 shows an exemplary Spark® (non-Java®) format 600, relating to the Spark® program 400 of FIG. 4, and involving a data conversion from a Java byte array to a Java® double array using the Spark® data representation and with use of the present invention, in accordance with an embodiment of the present invention.

Hence, in the exemplary Spark format 500 of FIG. 5, the present invention has not been applied, while the exemplary Spark format 600 of FIG. 6 results from an application of the present invention to the method 400 of FIG. 4. Referring to FIG. 6, the present invention reserves an area for JVM® metadata for a double array (1.0 and 8.0) in UnsafeArrayData. Thus, "getJavaArrayObjectPointer( )" puts metadata for JVM and returns an address of the metadata to return the Java object.

Figure 7:
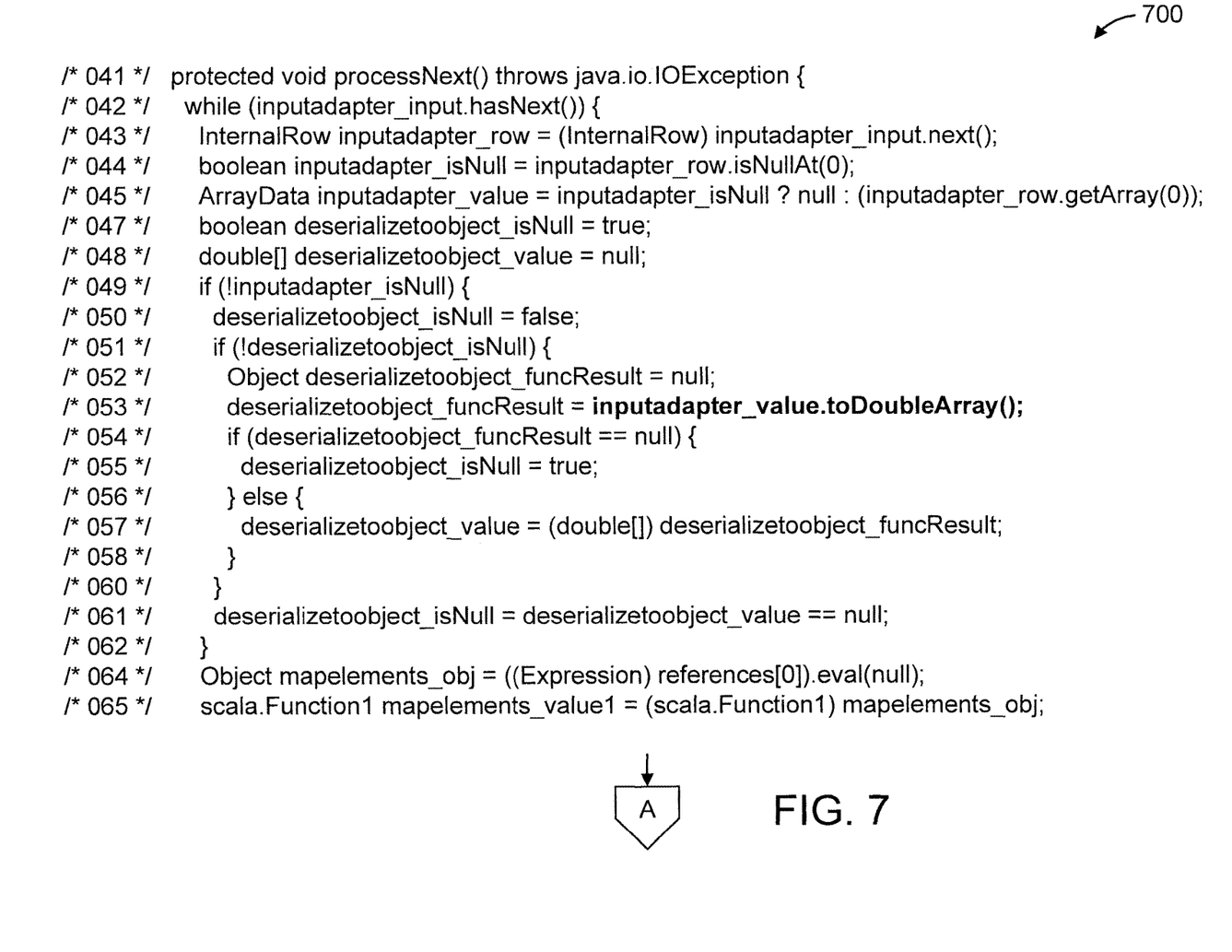
FIGS. 7-8 show exemplary code generated by Spark® for the Spark® program of FIG. 4, without use of the present invention.
Figure 8:
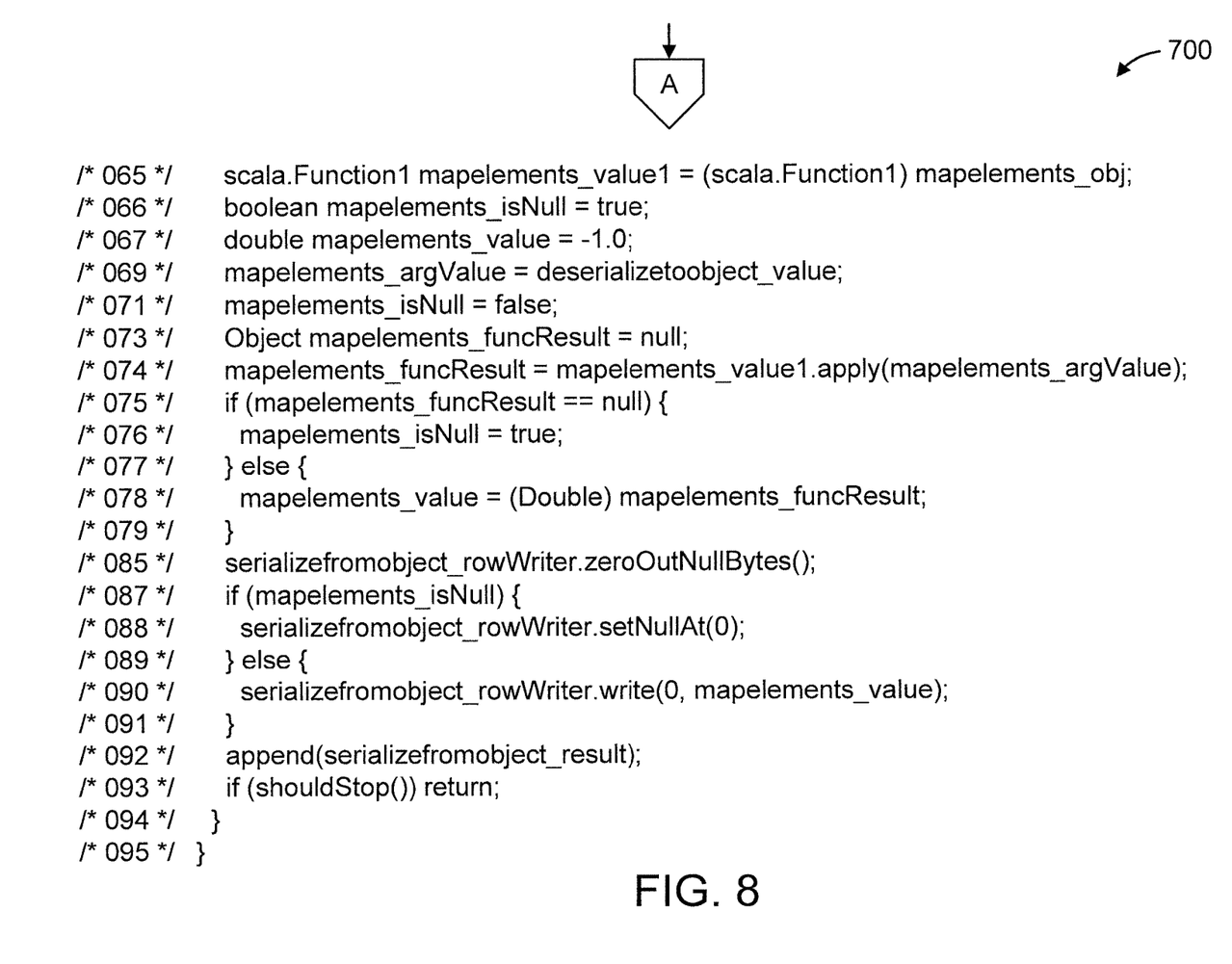

FIGS. 7-8 show exemplary code 700 generated by Spark® for the Spark® program 400 of FIG. 4, without use of the present invention. The code 700 involves undue overhead relating to the data conversion operation shown in bolded font in FIG. 7. This overhead can be reduced by application of the present invention to the Spark® program 400 of FIG. 4, as shown in FIGS. 9-10.

Figure 9:
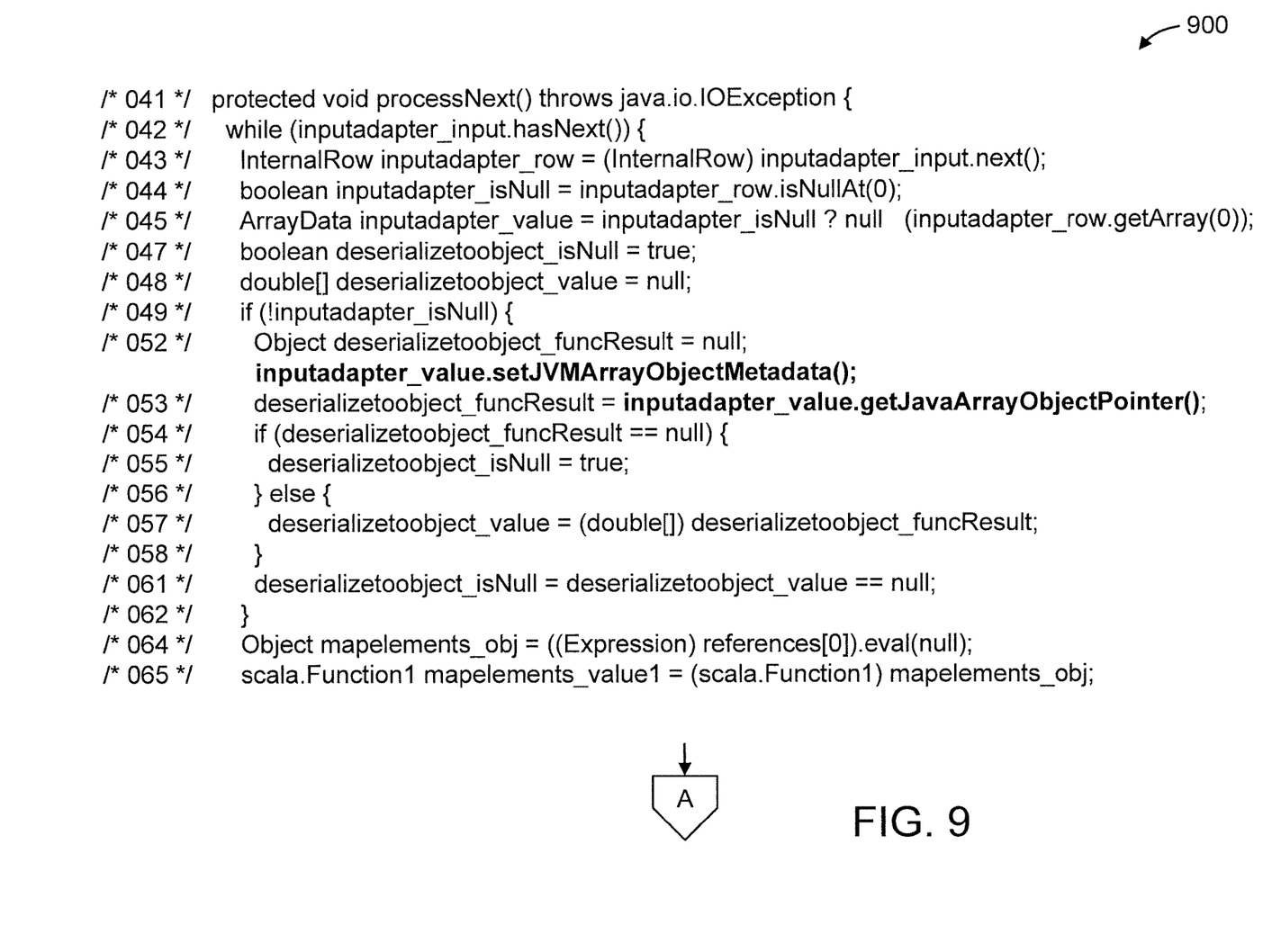
FIGS. 9-10 shows exemplary code generated by the present invention for the Spark program of FIG. 4, in accordance with an embodiment of the present invention.
Figure 10:
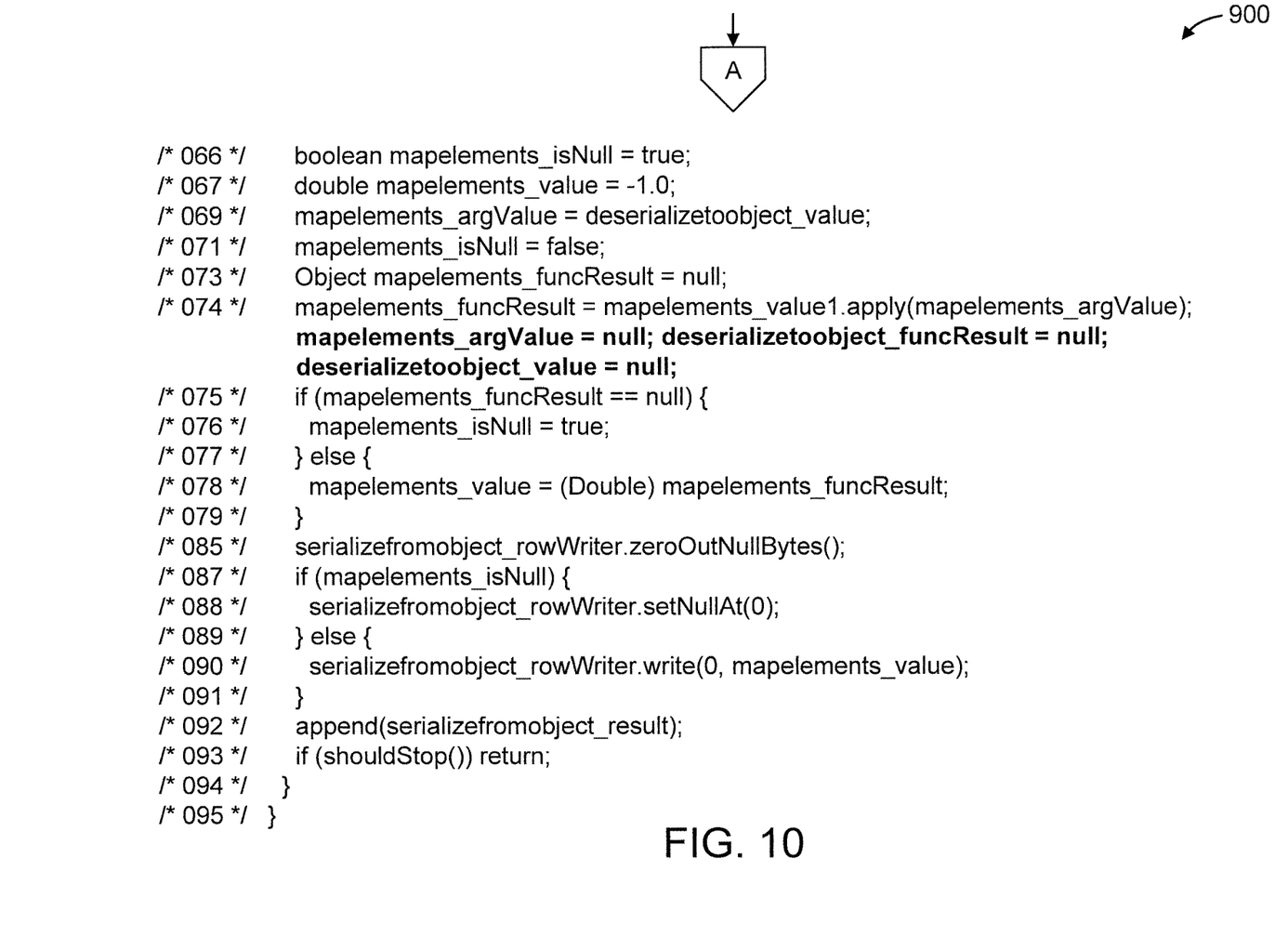

FIGS. 9-10 shows exemplary code 900 generated by the present invention for the Spark program 400 of FIG. 4, in accordance with an embodiment of the present invention. That is, code 900 is generated using the method of the present invention (e.g., method 400) directed to reducing the overhead of a data conversion between Java and non-Java representations. As can be seen relative to the code 700 of FIGS. 7-8, the code 900 of FIGS. 9-10 involves less overhead for the data conversion operation. New code generated by the present invention is shown in FIGS. 9-10 in bold font.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method, comprising:
   converting a first object having a first data format to a second object having a second data format that is different from the first data format, the first data format lacking an object header and the second data format including an object header, the converting comprising:
   adding the object header to the first object; and
   returning, as a pointer, an address of the added object header to a user defined function that uses the second object,
   wherein the first object lacks pointers to other objects, and does not escape.

2. The computer-implemented method of claim 1, wherein the first object is a Spark source object and the second object is a Java source object.

3. The computer-implemented method of claim 1, wherein a lifetime of the second object is kept shorter than a lifetime of the first object.

4. The computer-implemented method of claim 1, further comprising adjusting a pointer to the second object when the first object is moved by a garbage collection process.

5. The computer-implemented method of claim 4, wherein both the first object and the second object are freed by the garbage collection process.

6. The computer-implemented method of claim 4, wherein the second object is uncopied by the garbage collection process.

7. The computer-implemented method of claim 1, wherein the pointer is nullified after a last use of the pointer by any of the first object and the second object, wherein the last use is determined based on respective lifetimes of the first object and the second object.

8. The computer-implemented method of claim 1, wherein said adding step adds the address to the object header of the first object as metadata.

9. The computer-implemented method of claim 8, wherein the metadata is dependent on a managed runtime that is currently running.

10. The computer-implemented method of claim 1, wherein the first object is an array object.

11. A computer program product comprising a non-transitory computer readable storage medium having program instructions embodied therewith, the program instructions executable by a computer to cause the computer to perfoim a method comprising:
    converting a first object having a first data format to a second object having a second data format that is different from the first data format, the first data format lacking an object header and the second data format including an object header, the converting comprising:
    adding the object header to the first object; and
    returning, as a pointer, an address of the added object header to a user defined function that uses the second object,
    wherein the first object lacks pointers to other objects, and does not escape.

12. The computer program product of claim 11, wherein the first object is a Spark source object and the second object is a Java source object.

13. The computer program product of claim 11, wherein a lifetime of the second object is kept shorter than a lifetime of the first object.

14. The computer program product of claim 11, further comprising adjusting a pointer to the second object when the first object is moved by a garbage collection process.

15. The computer program product of claim 14, wherein both the first object and the second object are freed by the garbage collection process.

16. The computer program product of claim 14, wherein the second object is uncopied by the garbage collection process.

17. The computer program product of claim 11, wherein the pointer is nullified after a last use of the pointer by any of the first object and the second object, wherein the last use is determined based on respective lifetimes of the first object and the second object.

18. The computer program product of claim 11, wherein said adding step adds the address to the object header of the first object as metadata.

19. The computer program product of claim 18, wherein the metadata is dependent on a managed runtime that is currently running.

20. The computer program product of claim 11, wherein the first object is an array object.

* * * * *